United States Patent
Wakita et al.

(10) Patent No.: US 11,860,275 B2
(45) Date of Patent: Jan. 2, 2024

(54) OBJECT DETECTION DEVICE AND MOVABLE BODY CONTROL DEVICE

(71) Applicant: AISIN CORPORATION, Aichi (JP)

(72) Inventors: Kosuke Wakita, Kariya (JP); Ippei Sugae, Kariya (JP)

(73) Assignee: AISIN CORPORATION, Aichi (JP)

( * ) Notice: Subject to any disclaimer, the term of this patent is extended or adjusted under 35 U.S.C. 154(b) by 144 days.

(21) Appl. No.: 17/666,791

(22) Filed: Feb. 8, 2022

(65) Prior Publication Data

US 2022/0252724 A1     Aug. 11, 2022

(30) Foreign Application Priority Data

Feb. 9, 2021   (JP) ................. 2021-019365

(51) Int. Cl.
  *G01S 15/93*   (2020.01)
  *G01S 15/10*   (2006.01)
  *G01S 7/52*    (2006.01)
  *G01S 15/931*  (2020.01)

(52) U.S. Cl.
  CPC ........ *G01S 15/931* (2013.01); *G01S 7/52004* (2013.01); *G01S 15/101* (2013.01); *G01S 2015/938* (2013.01)

(58) Field of Classification Search
  CPC .. G01S 15/101; G01S 15/931; G01S 7/52004; G01S 2015/938; G02B 7/40
  See application file for complete search history.

(56) References Cited

U.S. PATENT DOCUMENTS

| | | | | |
|---|---|---|---|---|
| 9,056,615 | B2* | 6/2015 | Harda | B60R 21/0134 |
| 9,965,956 | B2* | 5/2018 | Tsushima | B60W 30/09 |
| 10,180,491 | B2* | 1/2019 | Naruse | G08G 1/166 |
| 2011/0238309 | A1* | 9/2011 | Tsunekawa | G08G 1/165 |
| | | | | 701/301 |
| 2016/0116588 | A1* | 4/2016 | Fukuman | G01S 15/931 |
| | | | | 367/93 |
| 2021/0041551 | A1* | 2/2021 | Nishikido | G01S 13/42 |

FOREIGN PATENT DOCUMENTS

| | | |
|---|---|---|
| JP | 61-001180 U | 1/1986 |
| JP | 06-331742 A | 12/1994 |
| JP | 2015-202724 A | 11/2015 |
| JP | 2017-125821 A | 7/2017 |
| JP | 2017-182300 A | 10/2017 |

* cited by examiner

*Primary Examiner* — Daniel L Murphy
*Assistant Examiner* — Amie M Ndure
(74) *Attorney, Agent, or Firm* — Sughrue Mion, PLLC (57) ABSTRACT

An object detection device includes: a transmission and reception unit configured to transmit a transmission wave including an ultrasonic wave having directivity in a direction parallel or substantially parallel to a traveling direction of a movable body, and receive a reflected wave from an object; a determination unit configured to determine presence or absence of an abnormality based on a predetermined reference distance and a downward distance between the transmission and reception unit and an object present below the transmission and reception unit in a vertical direction, the downward distance being calculated based on a reflected wave of an ultrasonic wave of the transmission wave traveling downward in the vertical direction from the transmission and reception unit; and an output unit configured to output information regarding the abnormality.

11 Claims, 11 Drawing Sheets

OBJECT DETECTION DEVICE AND MOVABLE BODY CONTROL DEVICE

CROSS REFERENCE TO RELATED APPLICATIONS

This application is based on and claims priority under 35 U.S.C. § 119 to Japanese Patent Application 2021-019365, filed on Feb. 9, 2021, the entire content of which is incorporated herein by reference.

TECHNICAL FIELD

This disclosure relates to an object detection device and a movable body control device.

BACKGROUND DISCUSSION

In a system or the like that controls a movable body such as a vehicle, an object detection device that detects an object present around the movable body based on a time (TOF: Time of Flight) until transmitted ultrasonic waves are reflected by an object and returned is used. In such an object detection device, a technique of imparting directivity to the ultrasonic waves is used (JPS61-1180U (Reference 1) and JPH6-331742A (Reference 2)).

The ultrasonic waves having directivity include a component (non-directional component) traveling in a direction other than a direction corresponding to the directivity. In the related art, since such a non-directional component is not effectively used, there is a room for improvement.

A need thus exists for an object detection device and a movable body control device which are not susceptible to the drawback mentioned above.

SUMMARY

An object detection device as an example of this disclosure includes: a transmission and reception unit configured to transmit a transmission wave including an ultrasonic wave having directivity in a direction parallel or substantially parallel to a traveling direction of a movable body, and receive a reflected wave from an object; a determination unit configured to determine presence or absence of an abnormality based on a predetermined reference distance and a downward distance between the transmission and reception unit and an object present below the transmission and reception unit in a vertical direction, the downward distance being calculated based on a reflected wave of an ultrasonic wave of the transmission wave traveling downward in the vertical direction from the transmission and reception unit; and an output unit configured to output information regarding the abnormality.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings. Configurations of the embodiments described below and operations and effects provided by the configurations are merely examples, and this disclosure is not limited to the following description.

First Embodiment

Figure 1:
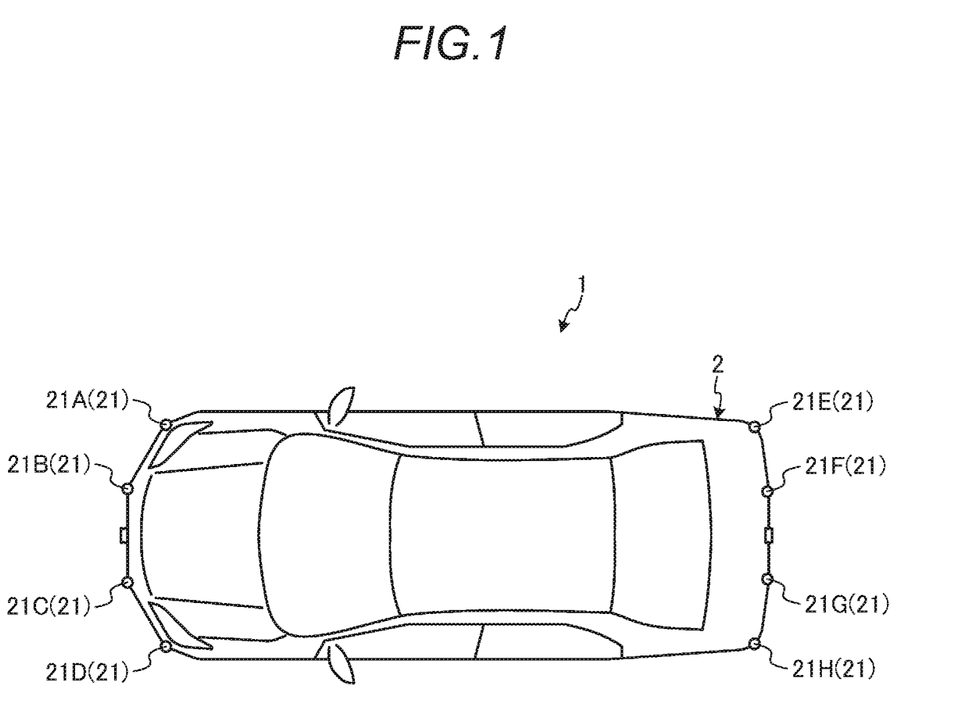
FIG. 1 is a top view showing an example of a configuration of a vehicle according to a first embodiment.

FIG. 1 is a top view showing an example of a configuration of a vehicle 1 according to a first embodiment. The vehicle 1 is an example of a movable body on which an object detection device according to the present embodiment is mounted. The object detection device according to the present embodiment is a device that detects an object (other vehicles, a structure, a pedestrian, or the like) present around the vehicle 1 based on TOF, Doppler shift information or the like acquired by transmitting ultrasonic waves from the vehicle 1 and receiving reflected waves from the object.

The object detection device according to the present embodiment includes a plurality of transmission and reception units 21A to 21H (hereinafter, referred to as a transmission and reception unit 21 when it is not required to distinguish the plurality of transmission and reception units 21A to 21H). All of the transmission and reception units 21 are provided on a vehicle body 2 serving as an exterior of the vehicle 1, transmit ultrasonic waves (transmission waves) to the outside of the vehicle body 2, and receive reflected waves from an object present outside the vehicle body 2. In the example shown in FIG. 1, four transmission and reception units 21A to 21D are disposed at a front end portion of the vehicle body 2, and four transmission and reception units 21E to 21H are disposed at a rear end portion. The number of transmission and reception units 21 and positions where the transmission and reception units 21 are provided are not limited to the above example.

Figure 2:
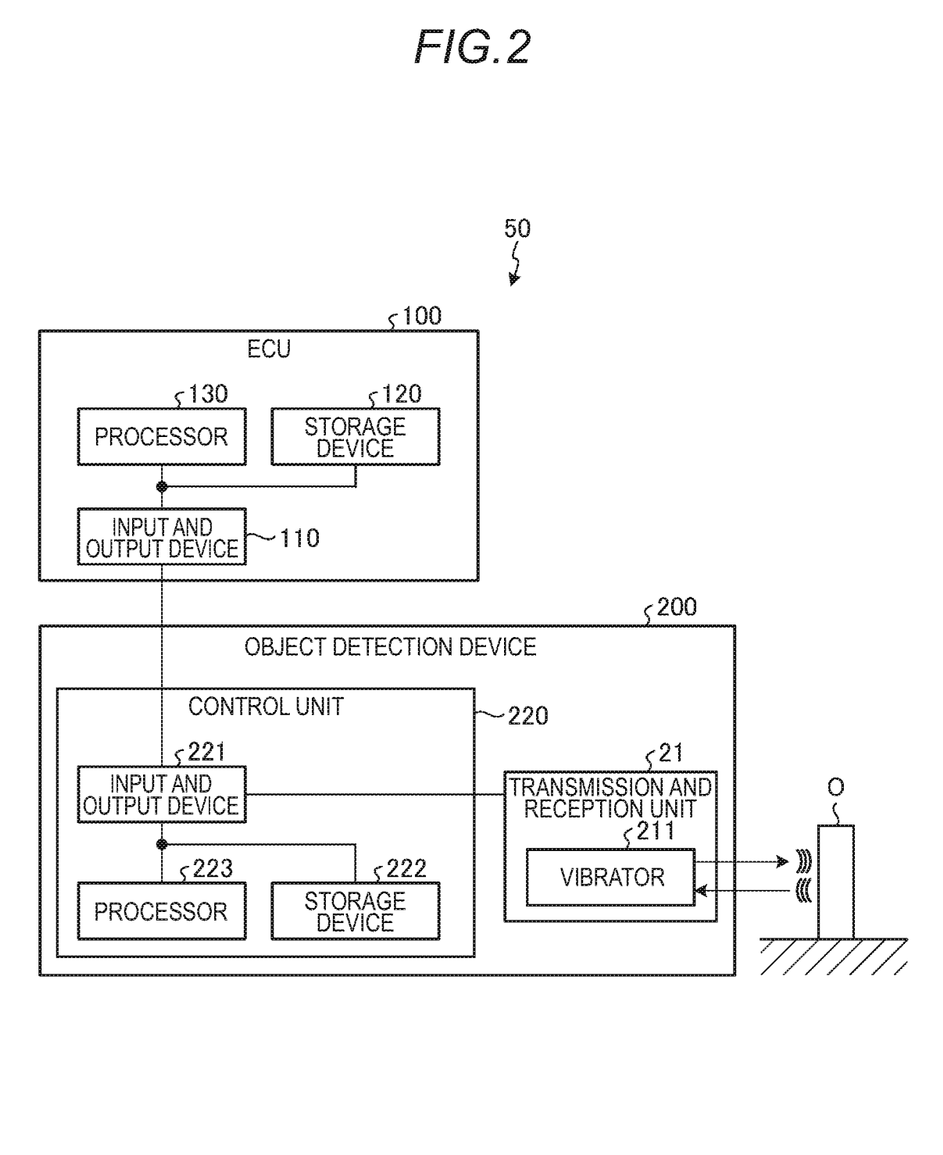
FIG. 2 is a block diagram showing an example of a configuration of a vehicle control device according to the first embodiment.

FIG. 2 is a block diagram showing an example of a configuration of a vehicle control device 50 according to the first embodiment. The vehicle control device 50 (an example of a movable body control device) performs a process for controlling the vehicle 1 based on information output from an object detection device 200. The vehicle control device 50 according to the present embodiment includes an ECU 100 and the object detection device 200.

The object detection device 200 includes the plurality of transmission and reception units 21 and a control unit 220. Each of the transmission and reception units 21 includes a vibrator 211 configured using a piezoelectric element, an amplifier, and the like, and achieves transmission and reception of the ultrasonic waves by vibration of the vibrator 211. Specifically, the transmission and reception unit 21 transmits, as the transmission waves, ultrasonic waves generated in response to the vibration of the vibrator 211, and detects vibration of the vibrator 211 caused by reflected waves that are generated by an object O reflecting the transmission waves. The vibration of the vibrator 211 is converted into an electric signal, and it is possible to acquire, based on the electric signal, a TOF corresponding to a distance from the transmission and reception unit 21 to the object O, Doppler shift information corresponding to a relative speed of the object O, and the like.

The transmission and reception unit 21 according to the embodiment transmits transmission waves including ultrasonic waves having directivity in a direction parallel or substantially parallel to a traveling direction of the vehicle 1. The transmission waves include ultrasonic waves (a non-directional component) traveling downward in a vertical direction from the transmission and reception unit 21. The transmission waves will be described below.

In the example shown in FIG. 2, a configuration in which both the transmission of the transmission waves and the reception of the reflected waves are performed by a single vibrator 211 is shown, but the configuration of the transmission and reception unit 21 is not limited thereto. For example, the configuration may be a configuration in which a transmission side and a reception side are separated, such as a configuration in which a vibrator for transmitting the transmission waves and a vibrator for receiving the reflected waves are separately provided.

The control unit 220 includes an input and output device 221, a storage device 222, and a processor 223. The input and output device 221 is an interface device for implementing transmission and reception of information between the control unit 220 and an external mechanism (the transmission and reception unit 21, the ECU 100 or the like). The storage device 222 includes a main memory device such as a read only memory (ROM) and a random access memory (RAM), and an auxiliary storage device such as a hard disk drive (HDD) and a solid state drive (SSD). The processor 223 is an integrated circuit that executes various processes for achieving a function of the control unit 220, and includes, for example, a central processing unit (CPU) that operates according to a program, an application specific integrated circuit (ASIC) designed for a specific application, and the like. The processor 223 executes various arithmetic processes and control processes by reading and executing programs stored in the storage device 222.

The ECU 100 is a unit that performs various processes for controlling the vehicle 1 based on various pieces of information acquired from the object detection device 200 or the like. The ECU 100 includes an input and output device 110, a storage device 120, and a processor 130. The input and output device 110 is an interface device for implementing transmission and reception of information between the ECU 100 and an external mechanism (the object detection device 200, a drive mechanism, a brake mechanism, a steering mechanism, a transmission mechanism, an in-vehicle display, a speaker or the like). The storage device 120 includes a main memory device such as a ROM and a RAM, and an auxiliary storage device such as an HDD and an SSD. The processor 130 is an integrated circuit that executes various processes for achieving a function of the ECU 100, and includes, for example, a CPU and an ASIC. The processor 130 executes various arithmetic processes and control processes by reading and executing programs stored in the storage device 120.

Figure 3:
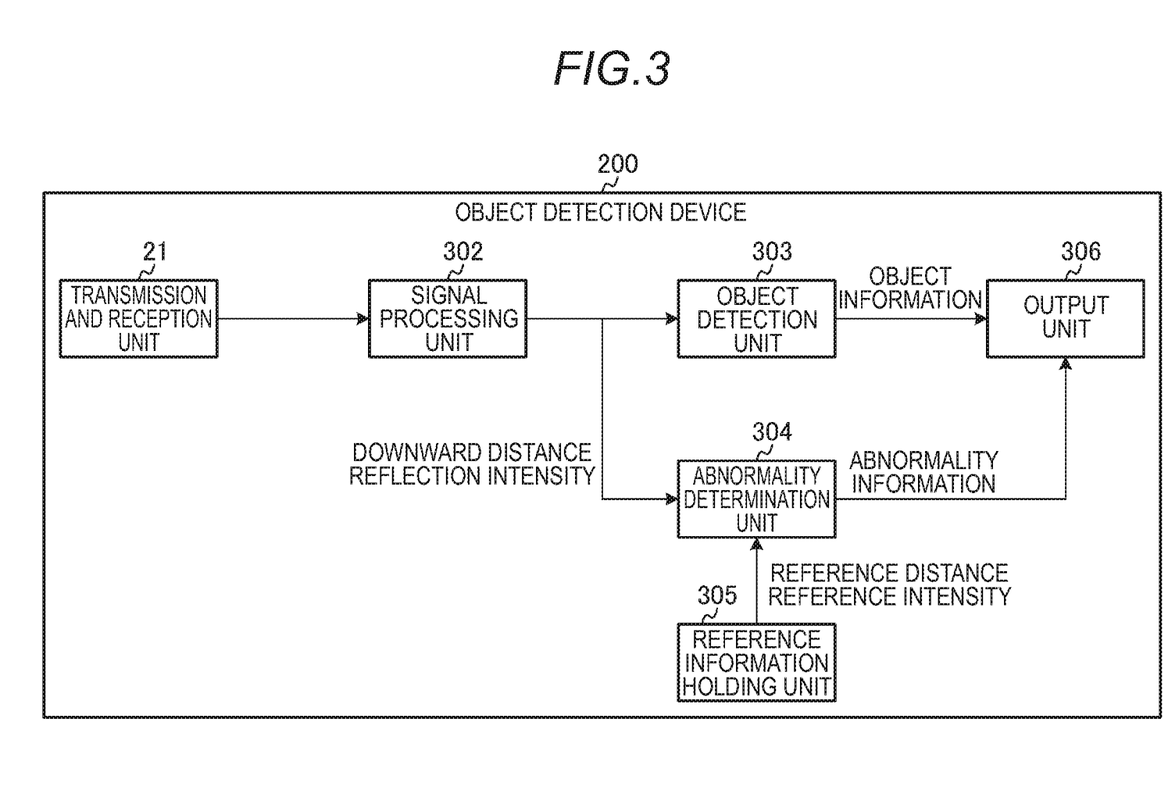
FIG. 3 is a block diagram showing an example of a function configuration of an object detection device according to the first embodiment.

FIG. 3 is a block diagram showing an example of a function configuration of the object detection device 200 according to the first embodiment. The object detection device 200 according to the present embodiment includes a signal processing unit 302, an object detection unit 303, an abnormality determination unit 304 (a determination unit), a reference information holding unit 305, and an output unit 306. These functional components 302 to 306 are implemented by cooperation of hardware components of the object detection device 200 shown in FIG. 2 and software components such as firmware and programs.

The signal processing unit 302 processes signals acquired by the transmission and reception unit 21 and generates various kinds of data. The signal processing unit 302 performs, for example, an amplification process, a filter process, and an envelope cure process on the electric signal corresponding to the vibration of the vibrator 211, and generates envelope curve data or the like indicating a change over time in an intensity (amplitude) of the ultrasonic waves transmitted and received by the transmission and reception unit 21. A TOF corresponding to the object present around the vehicle 1 can be detected and a distance from the vehicle 1 (the transmission and reception unit 21) to the object can be calculated based on the envelope curve data.

The object detection unit 303 detects the object (for example, other vehicles, a structure, a pedestrian or the like) present around the vehicle 1 based on the data generated by the signal processing unit 302, and generates object information regarding the object. The object information may include, for example, the distance from the vehicle 1 (the transmission and reception unit 21) to the object, a relative velocity of the object, and a type of the object.

The abnormality determination unit 304 determines presence or absence of an abnormality based on a predetermined reference distance and a downward distance between the transmission and reception unit 21 and an object present below the transmission and reception unit 21 in a vertical direction, the downward distance is calculated based on reflected waves of ultrasonic waves of the transmission waves traveling downward in the vertical direction from the transmission and reception unit 21. The ultrasonic waves traveling downward in the vertical direction from the transmission and reception unit 21 correspond to the non-directional component traveling in a direction other than the direction (the direction parallel or substantially parallel to the traveling direction of the vehicle 1) corresponding to the directivity in components of the transmission waves transmitted from the transmission and reception unit 21. An abnormality in this case may be intrusion of an object (for example, a child, or an animal) between the transmission and reception unit 21 and the road surface.

In addition, the abnormality determination unit 304 determines that there is an abnormality when the intensity of reflected waves corresponding to the reference distance or shorter does not reach the predetermined reference intensity. An abnormality in this case may be a malfunction (for example, a state in which the ultrasonic waves cannot be appropriately transmitted and received due to adhesion of dirt or the like) of the transmission and reception unit 21, or the like. In addition, the abnormality determination unit 304 determines the presence or absence of abnormality before the stopped (parked) vehicle 1 starts moving.

The reference information holding unit 305 holds the reference distance and the reference intensity used for the abnormality determination performed by the abnormality determination unit 304. The reference information holding unit 305 holds, as the reference distance, a distance corresponding to the height of the transmission and reception unit 21 from the road surface. In addition, the reference information holding unit 305 may set the downward distance calculated when the vehicle 1 is stopped (parked) as the reference distance. In addition, the reference information holding unit 305 holds an intensity of reflected waves corresponding to the reference distance as the reference intensity. The reference distance and the reference intensity are stored in a storage device, and are read when abnormality determination is to be performed by the abnormality determination unit 304 (for example, when the vehicle 1 transitions from a stopped state to a moving-start state).

The output unit 306 outputs the object information regarding the object detected by the object detection unit 303, the abnormality information regarding the abnormality determined by the abnormality determination unit 304, and the like. The abnormality information and the like is output to, for example, the ECU 100, and is used for control of the vehicle 1 (for example, warning to an occupant, traveling restriction process and the like).

Figure 4:
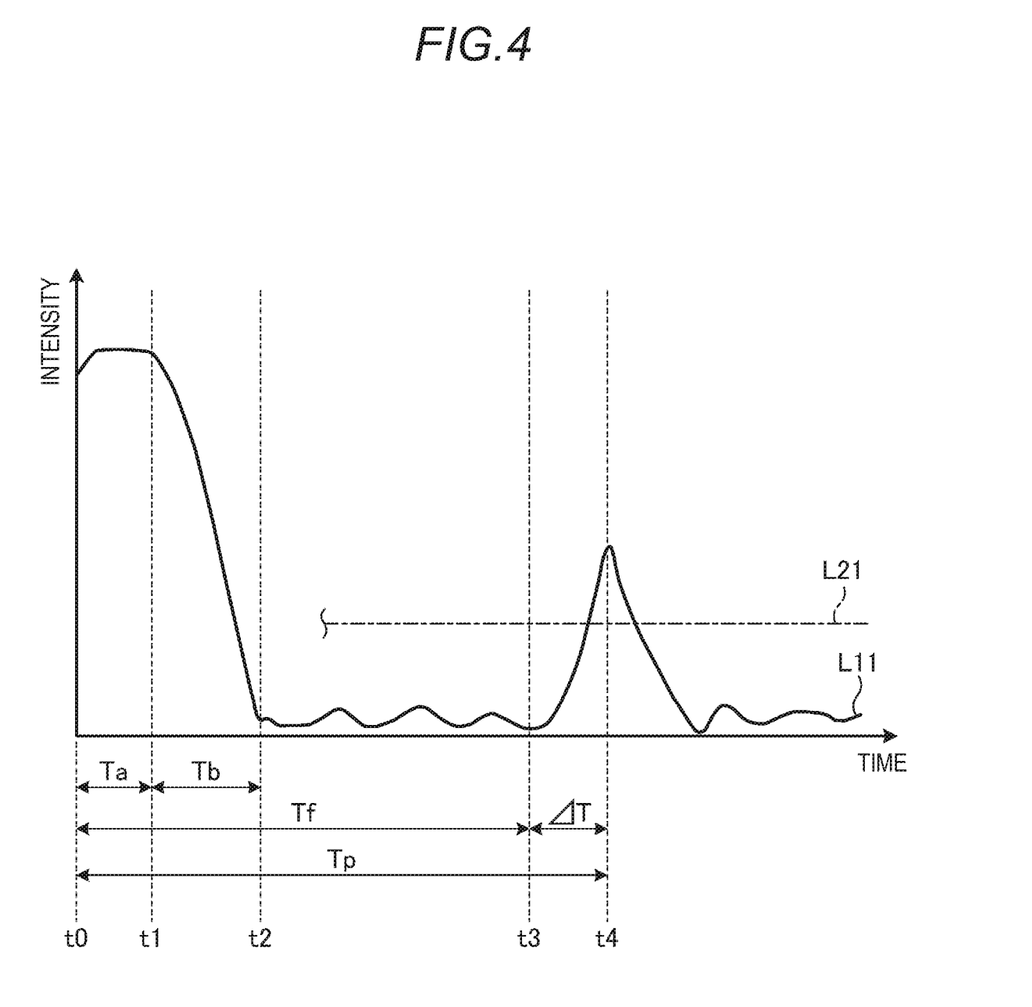
FIG. 4 is a diagram showing an envelope curve illustrating an overview of an object detection method using TOF in the first embodiment.

FIG. 4 is a diagram showing an envelope curve illustrating an overview of an object detection method using the TOF in the first embodiment. FIG. 4 illustrates an envelope cure showing the change over time in the intensity of the ultrasonic waves transmitted and received by the transmission and reception unit 21. In the graph shown in FIG. 4, a horizontal axis corresponds to a time (the TOF), and a vertical axis corresponds to the intensity of ultrasonic waves transmitted and received by the transmission and reception unit 21.

A solid line L11 represents an example of the envelope cure indicating the change over time in the intensity indicating magnitude of the vibration of the vibrator 211. It can be seen from the solid line L11 that the vibrator 211 is driven to vibrate only for a time Ta from a timing t0, transmission of the transmission waves is completed at a timing t1, and then the vibration of the vibrator 211 due to inertia continues while being attenuated during a time Tb from the timing t1 to a timing t2. Therefore, in the graph shown in FIG. 4, the time Tb corresponds to reverberation time.

The solid line L11 reaches a peak, at which the magnitude of the vibration of the vibrator 211 exceeds (or equal to or higher than) a predetermined threshold value represented by a one-dot chain line L21, at a timing t4 at which a time Tp elapses from the timing t0 at which the transmission of the transmission waves is started. The threshold value is a value which is preset to identify whether the vibration of the vibrator 211 is caused by the reception of reflected waves from the object to be detected, or caused by the reception of reflected waves from an object not to be detected. Here, although the threshold value represented by the one-dot chain line L21 is shown as a constant value, the threshold value may be a variable value that changes depending on an elapse of time, situations or the like.

Vibration having a peak exceeding (or equal to or higher than) the threshold value represented by the one-dot chain line L21 can be regarded as being caused by the reception of reflected waves from the object to be detected. On the other hand, vibration having a peak equal to or lower than (or less than) the threshold value can be regarded as being caused by the reception of reflected waves from the object not to be detected. Therefore, it can be seen from the solid line L11 that the vibration of the vibrator 211 at the timing t4 is caused by the reception of reflected waves from the object to be detected.

In the solid line L11, the vibration of the vibrator 211 is attenuated after the timing t4. Therefore, the timing t4 corresponds to a timing at which the reception of reflected waves from the object to be detected is completed, in other words, a timing at which transmission waves last transmitted at the timing t1 are returned as the reflected waves.

In addition, in the solid line L11, a timing t3 serving as a start point of the peak at the timing t4 corresponds to a timing at which the reception of reflected waves from the object to be detected starts, in other words, a timing at which transmission waves first transmitted at the timing t0 are returned as the reflected waves. Therefore, a time $\Delta T$ between the timing t3 and the timing t4 is equal to the time Ta serving as a transmission time of the transmission waves.

Based on the above, in order to obtain the distance to the object by using the TOF, it is necessary to obtain a time Tf between the timing t0 at which the transmission waves start to be transmitted and the timing t3 at which the reflected waves start to be received. The time Tf can be obtained by subtracting the time $\Delta T$, that is equal to the time Ta serving as the transmission time of the transmission waves, from the time Tp which is a difference between the timing t0 and the timing t4 at which the intensity of the reflected waves exceeds the threshold value and reaches the peak.

The timing t0 at which the transmission waves start to be transmitted can be easily specified as a timing at which the object detection device 200 starts operating, and the time Ta serving as the transmission time of the transmission waves is predetermined by a setting or the like. Therefore, the distance to the object to be detected can be obtained by specifying the timing t4 at which the intensity of the reflected waves exceeds the threshold value and reaches the peak.

Figure 5:
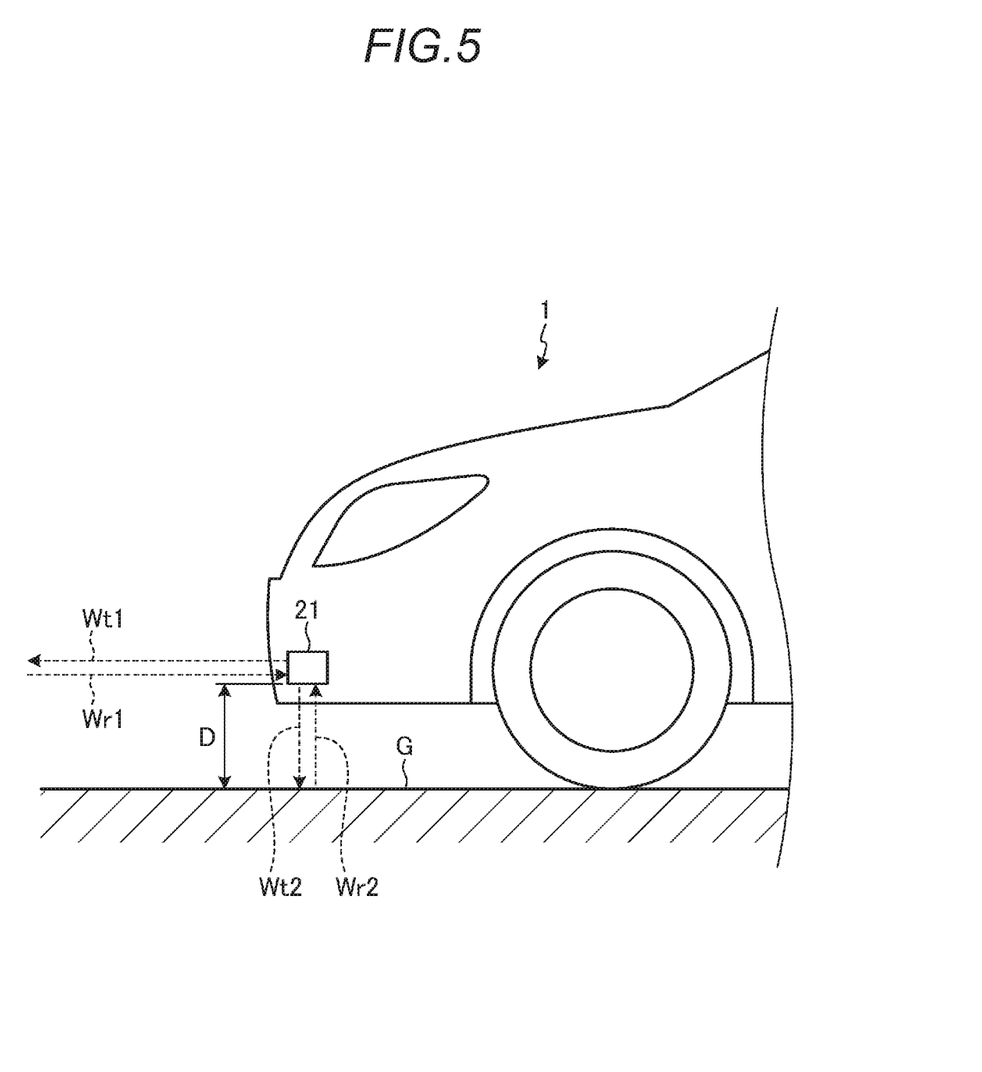
FIG. 5 is a diagram showing an example of characteristics of an ultrasonic wave transmitted and received by a transmission and reception unit according to the present embodiment.

FIG. 5 is a diagram showing an example of characteristics of the ultrasonic waves transmitted and received by the transmission and reception unit 21 according to the present embodiment. The transmission waves transmitted from the transmission and reception unit 21 according to the present embodiment includes transmission waves Wt1 having directivity in the direction parallel or substantially parallel to the traveling direction of the vehicle 1 and transmission waves Wt2 traveling downward in the vertical direction from the transmission and reception unit 21. The transmission waves Wt2 correspond to the above non-directional component.

The direction parallel or substantially parallel to the traveling direction of the vehicle 1 includes a forward direction, a backward direction, a vehicle width direction, and the like. The transmission waves transmitted from the transmission and reception unit 21 may be an ultrasonic wave that includes the transmission waves Wt1 as a main lobe and includes the transmission waves Wt2 as a side lobe. The transmission and reception unit 21 receives reflected waves Wr1 generated by an object (for example, other vehicles, a structure, a pedestrian, or the like) present in the direction parallel or substantially parallel to the traveling direction of the vehicle 1 reflecting the transmission waves Wt1. In addition, the transmission and reception unit 21 receives reflected waves Wr2 generated by an object (for example, a road surface G, an object entering between the transmission and reception unit 21 and the road surface G) present below the transmission and reception unit 21 in the vertical direction reflecting the transmission waves Wt2. When no object presents between the transmission and reception unit 21 and the road surface G, a TOF corresponding to a distance D between the transmission and reception unit 21 and the road surface G is detected. The distance D is an example of the above reference distance.

Figure 6:
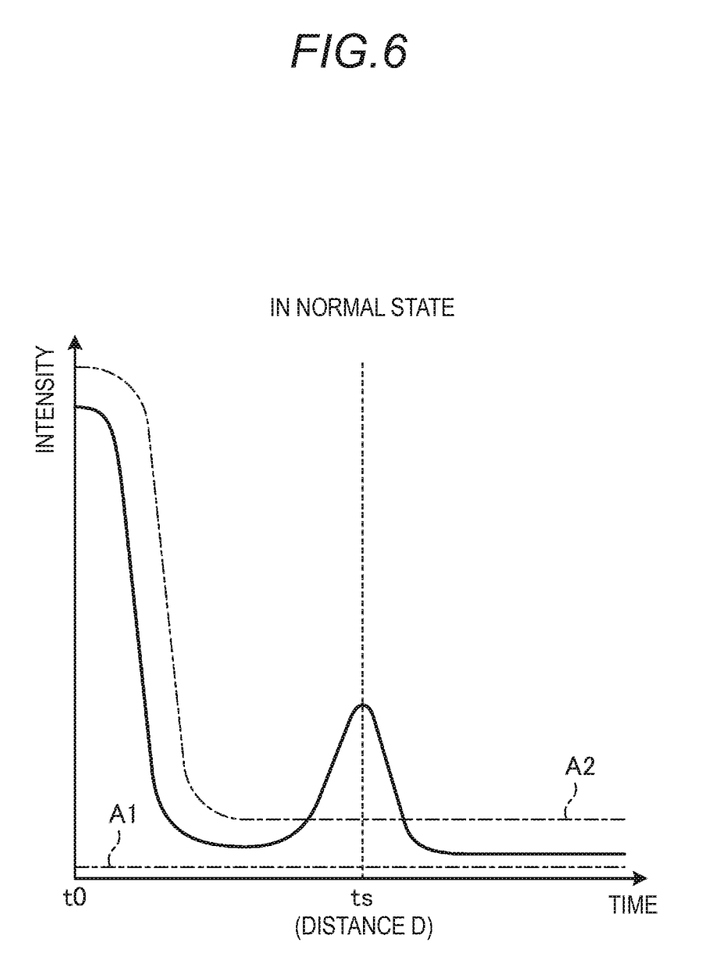
FIG. 6 is a graph showing an example of the envelope curve detected in a normal state in the first embodiment.

FIG. 6 is a graph showing an example of the envelope curve detected in a normal state in the first embodiment. In FIG. 6, a horizontal axis corresponds to an elapsed time from when the transmission waves Wt1 and Wt2 are transmitted, and a vertical axis corresponds to the intensity of the ultrasonic waves transmitted and received by the transmission and reception unit 21. In addition, FIG. 6 shows a threshold value A1 and a threshold value A2. The threshold value A1 is a threshold value set for removing noise caused by a structure or the like of the transmission and reception unit 21. The threshold value A2 is a threshold value for detecting a peak corresponding to the reference distance (the distance D in this embodiment) by the reflected waves Wr2 of the transmission waves Wt2 traveling downward in the vertical direction from the transmission and reception unit 21. The threshold value A2 is preferably a value lower than a threshold value (for example, the threshold value indicated by the one-dot chain line L21 in FIG. 4) for detecting a normal object to be detected (other vehicles, a structure, a pedestrian, and the like).

As shown in FIG. 6, in the normal state (in a case where there is no abnormality such as intrusion of an object below the vehicle 1, the malfunction of the transmission and reception unit 21, or the like), a peak is detected at a timing ts (TOF: ts−t0) corresponding to the distance D. The timing ts (TOF: ts−t0) may be stored in the storage device in advance as a known value, or may be measured at a predetermined timing (for example, a timing when parking of the vehicle 1 is completed or before the vehicle 1 starts moving). That is, when a peak having an intensity exceeding the threshold value A2 is detected at the timing ts corresponding to the distance D serving as the reference distance, a normal state can be determined.

Figure 7:
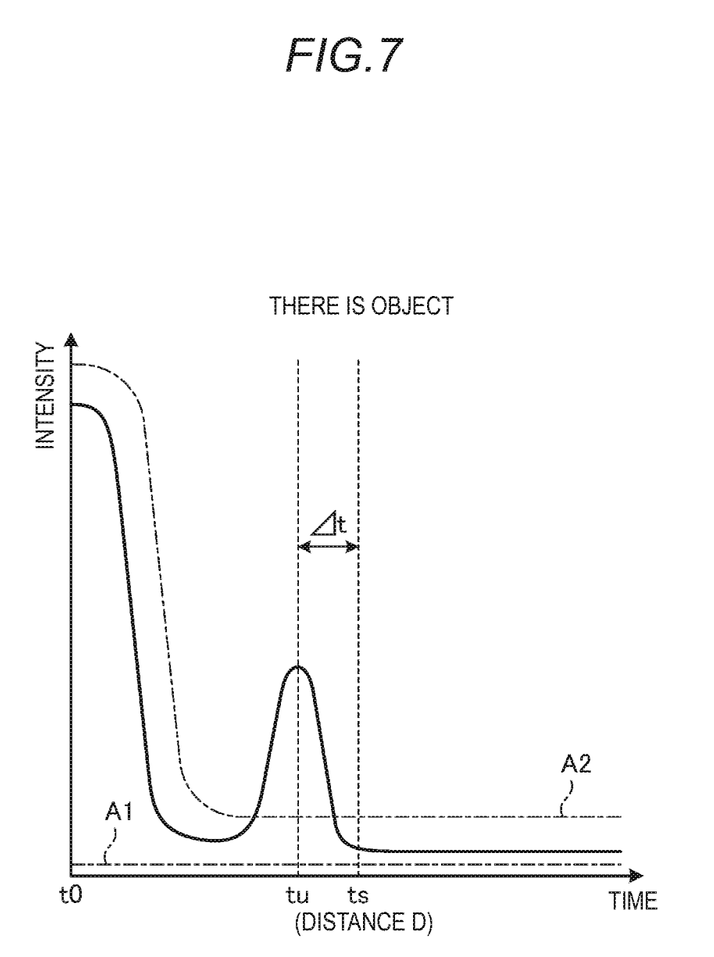
FIG. 7 is a graph showing an example of the envelope curve detected when an object enters between the transmission and reception unit and a road surface in the first embodiment.

FIG. 7 is a graph showing an example of the envelope curve detected when an object enters between the transmission and reception unit 21 and the road surface G in the first embodiment. As shown in FIG. 7, when an object presents between the transmission and reception unit 21 and the road surface G, a peak is detected at a timing tu before the timing ts corresponding to the distance D. At this time, a time difference $\Delta t = ts - tu$ corresponds to a height of the object from the road surface G. Thus, when the peak having an intensity exceeding the threshold value A2 is detected at the timing tu before the timing ts corresponding to the distance D serving as the reference distance, a state (a state of intrusion of an object below the vehicle 1) in which there is an abnormality can be determined.

Figure 8:
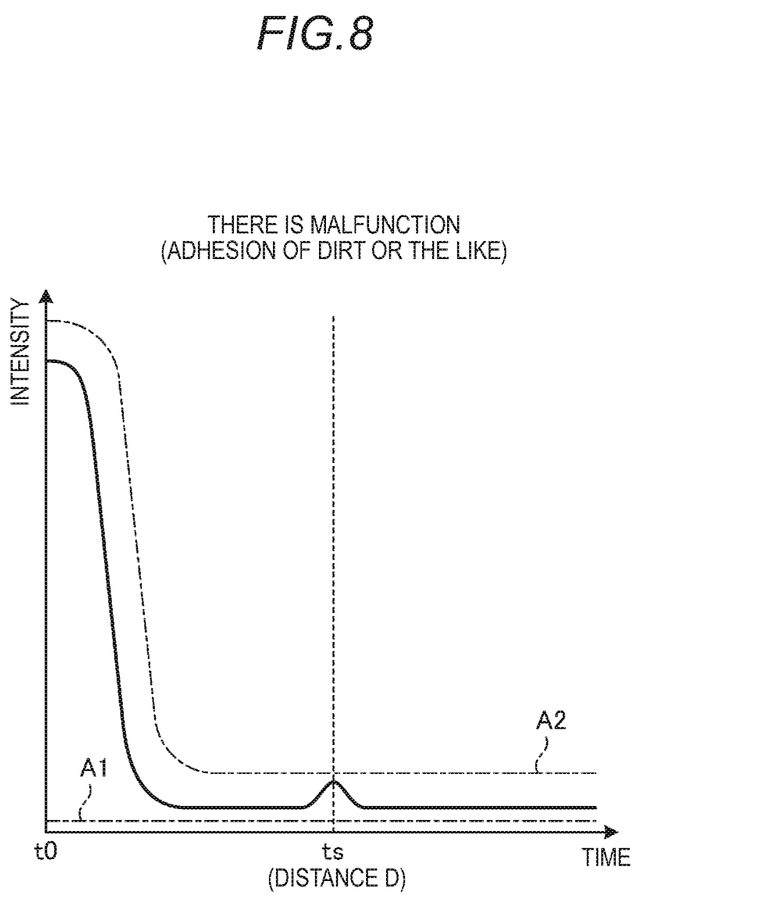
FIG. 8 is a graph showing an example of the envelope curve detected when a malfunction occurs in the transmission and reception unit in the first embodiment.

FIG. 8 is a graph showing an example of the envelope curve detected when a malfunction occurs in the transmission and reception unit 21 in the first embodiment. As shown in FIG. 8, when a malfunction (adhesion of dirt or the like) occurs in the transmission and reception unit 21, a peak of the intensity reaching the threshold value A2 (an example of the reference intensity) is not detected in a period of time (t0 to ts) before the timing ts corresponding to the distance D. That is, when a peak having the intensity reaching the threshold value A2 is not detected in the period of time t0 to ts corresponding to not more than the distance D serving as the reference distance, it can be determined that there is an abnormality (a state in which a malfunction occurs in the transmission and reception unit 21, or the like).

Figure 9:
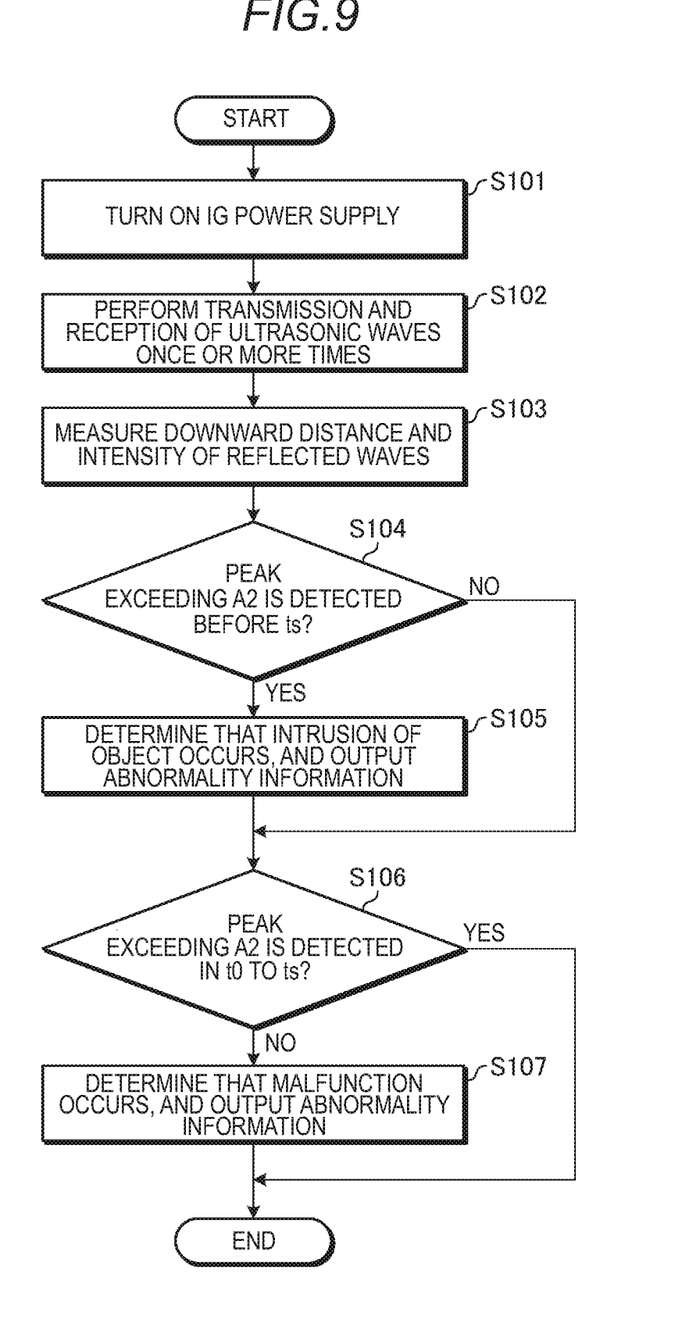
FIG. 9 is a flowchart showing an example of a process performed by the object detection device according to the first embodiment.

FIG. 9 is a flowchart showing an example of a process performed by the object detection device 200 according to the first embodiment. When an ignition power supply of the vehicle 1 is turned on (S101), the transmission and reception unit 21 performs transmission and reception of the ultrasonic waves (the transmission waves Wt1 and Wt2, and the reflected waves Wr1 and Wr2) once or more times (S102), and the signal processing unit 302 measures, based on envelope cure data or the like obtained based on a transmission and reception result of the ultrasonic waves, a downward distance, that is based on the reflected waves Wr2, and an intensity of the reflected waves Wr2 (S103).

The abnormality determination unit 304 determines, based on the measurement result, whether a peak exceeding the threshold value A2 is detected before the timing ts (S104). When the peak exceeding the threshold value A2 is detected before the timing ts (S104: Yes), the abnormality determination unit 304 determines that there is an abnormality such as intrusion of an object below the vehicle 1, and the output unit 306 outputs abnormality information indicating the abnormality to the ECU 100 or the like (S105). Next, the abnormality determination unit 304 determines, based on the measurement result, whether a peak having an intensity exceeding the threshold value A2 is detected in the period of time t0 to ts (S106). When no peak exceeding the threshold value A2 is detected before the timing ts (S104: No), step S106 is executed without executing step S105. When no peak having the intensity exceeding the threshold value A2 is detected in the period of time t0 to ts (S106: No), the abnormality determination unit 304 determines that there is an abnormality (adhesion of dirt) such as a malfunction of the transmission and reception unit 21, and the output unit 306 outputs abnormality information indicating the abnormality to the ECU 100 or the like (S107). When a peak having the intensity exceeding the threshold value A2 is detected in the period of time t0 to ts (S106: Yes), the routine ends without executing step S107.

A case in which the reference distance is the distance D between the transmission and reception unit 21 and the road surface G is described in the above, but the reference distance is not limited thereto.

Figure 10:
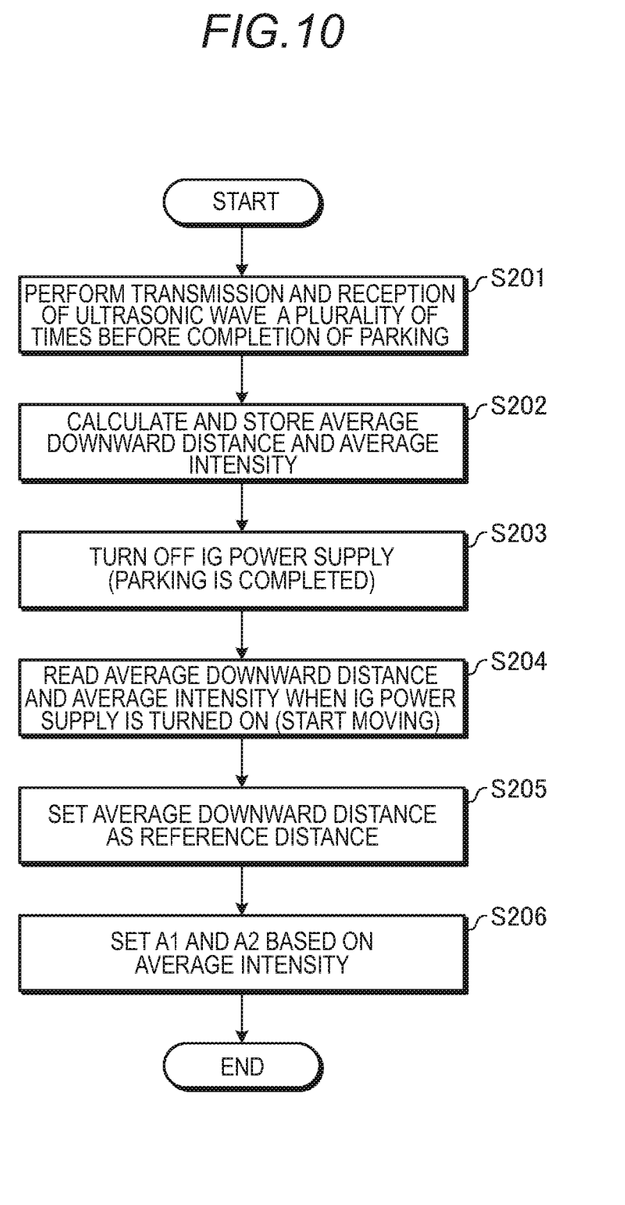
FIG. 10 is a flowchart showing an example of a method of setting a reference distance according to the first embodiment.

FIG. 10 is a flowchart showing an example of a method of setting the reference distance according to the first embodiment. Before parking of the vehicle 1 is completed, the transmission and reception unit 21 performs the transmission and reception of ultrasonic waves a plurality of times (S201). The signal processing unit 302 calculates, based on transmission and reception results of the ultrasonic waves, an average downward distance which is an average value of a plurality of downward distances and an average intensity which is an average value of the intensities of the reflected waves Wr2 corresponding to the plurality of downward distances, and the reference information holding unit 305 stores the average downward distance and the average intensity in the storage device (S202). When the parking is completed, the ignition power supply is turned off (S203).

Next, when the ignition power supply is turned on at the time when the vehicle 1 starts moving, the reference information holding unit 305 reads the average downward distance and the average intensity stored in the storage device (S204), sets the average downward distance as the reference distance (S205), and sets the threshold value A1 and the threshold value A2 based on the average intensity (S206). At this time, the threshold value A1 is set for removing low-intensity noise caused by the structure or the like of the transmission and reception unit 21. The threshold value A2 is set so as to enable detection of the reflected wave Wr2 from an object (an object present below the transmission and reception unit 21 in the vertical direction) corresponding to the average downward distance. The object corresponding to the average downward distance is the road surface G in many cases, but may be a curb, a parking block, or the like. An abnormality can be detected based on a state before parking by setting the reference distance and the reference intensity as described above. A case of using the average values obtained by performing the transmission and reception of the ultrasonic waves a plurality of times is described in the above, but a downward distance and an intensity obtained by transmitting and receiving the ultrasonic waves once may be set as the reference downward distance and the reference intensity.

The program for causing a computer (for example, the processor 223 of the control unit 220 and the processor 130 of the ECU 100) to execute the processes for achieving the various functions in the above embodiment can be provided by being recorded as an installable or executable format file in a computer-readable recording medium such as a CD (compact disc)-ROM, a flexible disc (FD), a CD-R (recordable), or a digital versatile disk (DVD). Further, the program may be provided or distributed via a network such as the Internet.

According to the above embodiment, by using the non-directional component (the transmission waves Wt2 and the reflected waves Wr2) included in the ultrasonic waves that are transmitted to detect an object present around the vehicle 1 and have the directivity, it is possible to detect an abnormality such as intrusion of an object below the vehicle 1, a malfunction of the transmission and reception unit 21. Accordingly, an abnormality can be detected without adding a separate sensor.

Hereinafter, another embodiment will be described with reference to a drawing, and the same reference numerals are given to portions having the same or similar operations and effects as those of the first embodiment, and the description thereof may be omitted.

Second Embodiment

Figure 11:
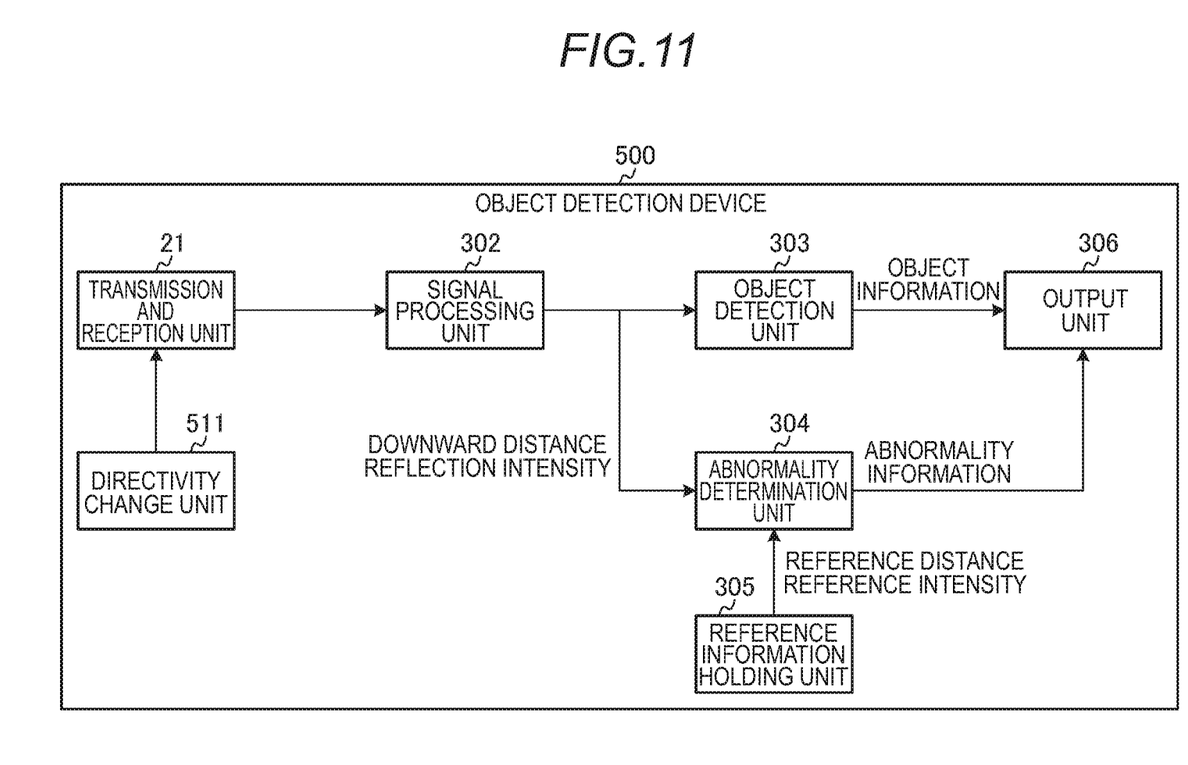
FIG. 11 is a block diagram showing an example of a function configuration of an object detection device according to a second embodiment.

FIG. 11 is a block diagram showing an example of a function configuration of an object detection device 500 according to a second embodiment. The object detection device 500 according to the present embodiment is different from the object detection device 200 according to the first embodiment in that the object detection device 500 includes a directivity change unit 511.

The directivity change unit 511 according to the present embodiment changes the directivity of the transmission waves (one or both of the transmission waves Wt1 and the transmission waves Wt2 shown in FIG. 5) transmitted from the transmission and reception unit 21. A method of changing the directivity of the transmission waves is not particularly limited, and for example, a method of adjusting an electrical application property with respect to a piezoelectric element constituting the vibrator 211 according to a desired directivity can be adopted.

According to the above configuration, accuracy of detection of an object and accuracy of detection of an abnormality can be improved in various situations.

An object detection device as an example of this disclosure includes: a transmission and reception unit configured to transmit a transmission wave including an ultrasonic wave having directivity in a direction parallel or substantially parallel to a traveling direction of a movable body, and receive a reflected wave from an object; a determination unit configured to determine presence or absence of an abnormality based on a predetermined reference distance and a downward distance between the transmission and reception unit and an object present below the transmission and reception unit in a vertical direction, the downward distance being calculated based on a reflected wave of an ultrasonic wave of the transmission wave traveling downward in the vertical direction from the transmission and reception unit; and an output unit configured to output information regarding the abnormality.

According to the above configuration, the abnormality can be detected by using the ultrasonic wave (a non-directional component) traveling downward in the vertical direction from the transmission and reception unit.

The determination unit may be configured to determine the presence or absence of the abnormality before the stopped movable body starts moving.

Accordingly, the abnormality (for example, intrusion of an object below a vehicle, a malfunction of the transmission and reception unit, or the like) generated when the movable body is stopped can be detected before the movable body starts moving.

The reference distance may be a distance corresponding to a height of the transmission and reception unit from a road surface.

Accordingly, intrusion of an object between the transmission and reception unit and the road surface can be detected.

The reference distance may be the downward distance calculated when the movable body is stopped.

Accordingly, the abnormality can be detected by comparing states below the transmission and reception unit when the movable body is stopped and started.

The determination unit may be configured to determine that there is an abnormality when the downward distance is shorter than the reference distance.

Accordingly, intrusion of the object between the movable body and the road surface can be detected.

The determination unit may be configured to determine that there is an abnormality when an intensity of the reflected wave corresponding to the reference distance or shorter does not reach a predetermined reference intensity.

Accordingly, the malfunction (for example, a state in which the ultrasonic wave cannot be appropriately transmitted and received due to adhesion of dirt or the like) of the transmission and reception unit can be detected.

The transmission wave may include, as a main lobe, the ultrasonic wave traveling in the direction parallel or substantially parallel to the traveling direction of the movable body, and may include, as a side lobe, the ultrasonic wave traveling downward in the vertical direction from the transmission and reception unit.

Accordingly, the abnormality can be detected by effectively using the side lobe (an example of the non-directional component) of the ultrasonic wave.

The object detection device may further include a directivity change unit configured to change the directivity.

Accordingly, accuracy of detection of the object or the abnormality can be improved in various situations.

In the object detection device, it may be determined that there is no abnormality when the downward distance between the transmission and reception unit and the object present below the transmission and reception unit in the vertical direction is shorter than the predetermined reference distance and is larger than a predetermined threshold value for determining that the object is a step that allows the movable body to climb over, and the information regarding the abnormality may not be output.

The predetermined threshold value may be variably set in consideration of an inclination of a movable object in a loading state.

A movable body control device as an example of this disclosure includes: the object detection device described above; and a control device configured to perform a process for controlling a movable body based on the information regarding the abnormality output from the object detection device.

Accordingly, the movable body can be controlled based on the abnormality detected by the object detection device described above.

Although the embodiments of this disclosure are described above, the embodiments described above and modifications thereof are presented by way of example only and are not intended to limit the scope of the invention. The novel embodiments and modifications thereof described above may be embodied in a variety of forms; furthermore, various omissions, substitutions, and changes in the form of the novel embodiments and modifications thereof may be made without departing from the gist of the invention. The embodiments and modifications thereof described above are included in the scope and gist of the invention, and are also included in the inventions described in the claims and their equivalents.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
   a transmission and reception unit configured to transmit a transmission wave including an ultrasonic wave having directivity in a direction parallel or substantially parallel to a traveling direction of a movable body, and receive a reflected wave from an object;
   a determination unit configured to determine presence or absence of an abnormality based on a predetermined reference distance and a downward distance between the transmission and reception unit and an object present below the transmission and reception unit in a vertical direction, the downward distance being calculated based on a reflected wave of an ultrasonic wave of the transmission wave traveling downward in the vertical direction from the transmission and reception unit; and
   an output unit configured to output information regarding the abnormality.

2. The object detection device according to claim 1, wherein
   the determination unit is configured to determine the presence or absence of the abnormality before the stopped movable body starts moving.

3. The object detection device according to claim 1, wherein
   the reference distance is a distance corresponding to a height of the transmission and reception unit from a road surface.

4. The object detection device according to claim 2, wherein
   the reference distance is the downward distance calculated when the movable body is stopped.

5. The object detection device according to claim 1, wherein
   the determination unit is configured to determine that there is an abnormality when the downward distance is shorter than the reference distance.

6. The object detection device according to claim 1, wherein
   the determination unit is configured to determine that there is an abnormality when an intensity of the reflected wave corresponding to the reference distance or shorter does not reach a predetermined reference intensity.

7. The object detection device according to claim 1, wherein
   the transmission wave includes, as a main lobe, the ultrasonic wave traveling in the direction parallel or substantially parallel to the traveling direction of the movable body, and includes, as a side lobe, the ultrasonic wave traveling downward in the vertical direction from the transmission and reception unit.

8. The object detection device according to claim 1, further comprising:
   a directivity change unit configured to change the directivity.

9. The object detection device according to claim 1, wherein
   it is determined that there is no abnormality when the downward distance between the transmission and reception unit and the object present below the transmission and reception unit in the vertical direction is shorter than the predetermined reference distance and is larger than a predetermined threshold value for determining that the object is a step that allows the movable body to climb over, and the information regarding the abnormality is not output.

10. The object detection device according to claim 9, wherein
    the predetermined threshold value is variably set in consideration of an inclination of a movable body in a loading state.

11. A movable body control device comprising:
    the object detection device according to claim 1; and
    a control device configured to perform a process for controlling a movable body based on the information regarding an abnormality output from the object detection device.

* * * * *